United States Patent
Roullier et al.

(10) Patent No.: US 9,917,691 B2
(45) Date of Patent: Mar. 13, 2018

(54) APPARATUS AND METHOD TO BRING OFFLINE DATA ONLINE WHILE PROTECTING CONSUMER PRIVACY

(71) Applicant: Acxiom Corporation, Conway, AR (US)

(72) Inventors: Thierry Roullier, Chicago, IL (US); Dana S. Robbins, Conway, AR (US); Linda Young, Miami, FL (US); Scott Jones, Little Rock, AR (US); Mike Zukerman, Solon, OH (US)

(73) Assignee: Acxiom Corporation, Conway, AR (US)

( * ) Notice: Subject to any disclaimer, the term of this patent is extended or adjusted under 35 U.S.C. 154(b) by 0 days.

(21) Appl. No.: 15/581,203

(22) Filed: Apr. 28, 2017

(65) Prior Publication Data
US 2017/0237555 A1    Aug. 17, 2017

Related U.S. Application Data

(63) Continuation of application No. 14/478,650, filed on Sep. 5, 2014, now Pat. No. 9,665,883.

(60) Provisional application No. 61/877,530, filed on Sep. 13, 2013, provisional application No. 61/877,536, filed on Sep. 13, 2013, provisional application No. 61/877,543, filed on Sep. 13, 2013.

(51) Int. Cl.
*H04L 29/06*    (2006.01)
*H04L 9/08*    (2006.01)
*G06Q 30/02*    (2012.01)
*G06F 21/62*    (2013.01)

(52) U.S. Cl.
CPC ........ *H04L 9/0819* (2013.01); *G06F 21/6245* (2013.01); *G06Q 30/0241* (2013.01)

(58) Field of Classification Search
CPC .............. H04L 9/0819; G06F 21/6245; G06Q 30/0241
See application file for complete search history.

(56) References Cited

U.S. PATENT DOCUMENTS

| | | | |
|---|---|---|---|
| 8,347,093 B1 * | 1/2013 | Ahmed ................... | G06F 21/31 713/168 |
| 2003/0074564 A1 * | 4/2003 | Peterson ............... | G06F 19/322 713/182 |

(Continued)

OTHER PUBLICATIONS

Unknown Author, "Offline Consumer Targeting", Published Apr. 3, 2008, Retrieved From http://www.findingdulcinea.com/guides/Technology/Internet/Internet-Marketing-and-Privacy.xa__1.html (Year: 2008).*

*Primary Examiner* — Chau Le

(57) ABSTRACT

A method and system for bringing together online and offline advertising uses anonymous links that are associated with consumer data. The anonymous links allow processing without personally identifiable information (PII) in a secure environment. Data is matched using the anonymous links, and further using identifiers that are encrypted for use in connection with individual match distribution partners. The method and system allows a marketer to utilize offline data to precisely target advertisements without the use of PII, and to perform analytics concerning the use of the online advertisements to more precisely determine the effectiveness of multichannel marketing efforts.

12 Claims, 12 Drawing Sheets

(56) References Cited

U.S. PATENT DOCUMENTS

| | | | | |
|---|---|---|---|---|
| 2010/0241493 A1* | 9/2010 | Onischuk | ............... | G07C 13/00 |
| | | | | 705/12 |
| 2011/0060905 A1* | 3/2011 | Stack | ..................... | G06Q 10/10 |
| | | | | 713/167 |
| 2013/0138569 A1* | 5/2013 | Yan | ........................ | G06Q 30/02 |
| | | | | 705/50 |
| 2015/0142585 A1* | 5/2015 | Scalise | ............... | G06Q 30/0277 |
| | | | | 705/14.73 |
| 2015/0262248 A1* | 9/2015 | Chaouki | ............ | G06Q 30/0269 |
| | | | | 705/14.66 |
| 2016/0292456 A1* | 10/2016 | Dubey | .............. | G06F 17/30289 |

* cited by examiner

APPARATUS AND METHOD TO BRING OFFLINE DATA ONLINE WHILE PROTECTING CONSUMER PRIVACY

CROSS-REFERENCE TO RELATED APPLICATIONS

This application is a continuation of U.S. patent application Ser. No. 14/478,650, entitled "Apparatus and Method for Bringing Offline Data Online While Protecting Consumer Privacy," filed on Sep. 5, 2014, which application claims the benefit of U.S. provisional patent application No. 61/877,530, entitled "Anonymous Consumer and Address Links," filed on Sep. 13, 2013; U.S. provisional patent application No. 61/877,536, entitled "Partner Encoded Links," filed on Sep. 13, 2013; and U.S. provisional patent application No. 61/877,543, entitled "Bringing Offline Data Online," filed on Sep. 13, 2013. Each of the foregoing provisional and nonprovisional patent applications is incorporated herein by reference in their entirety.

STATEMENT REGARDING FEDERALLY SPONSORED RESEARCH OR DEVELOPMENT

Not applicable.

BACKGROUND OF THE INVENTION

Retailers and other marketers today spend large sums of money building marketing databases. These databases may contain records pertaining to millions of individual consumers, which may be actual customers of the retailer or prospective customers ("prospects"). For each consumer, the database may contain hundreds or even thousands of individual data points. The data may include demographic information, lifestyle information, purchasing habits, and other information pertinent to marketing efforts or marketing analytics. That data may be used to personalize offers, cross-sell products, or even introduce completely new products. In addition, the data is used to understand the effectiveness of the retailers' marketing activities so that they may refine their marketing processes, in order to increase their return on investment. While beneficial to the retailer, this refinement also benefits consumers by bringing those consumers more relevant offers and products, rather than blanketing the consumers with offers or marketing messages that are not relevant to them. Recent investigations reveal that while a small number of consumers wish to "opt out" of targeted marketing efforts and thus prefer to receive untargeted advertising, far more consumers prefer that—if they are to receive marketing messages—that those messages be tailored to accurately reflect those products and services in which they are in fact likely to be interested.

Historically, the effective use of consumer data for making offers and analyzing marketing campaign effectiveness has only been possible in marketing channels where consumer personalized information, such as name, address, telephone number, or email, was readily available. These channels include traditional "offline" channels, such as, for example, direct mail efforts, in which a mailing list of consumers and addresses is used to physically mail marketing offers to individual consumers. Online advertising efforts, such as banner advertising on web pages and various marketing messages that appear when using mobile devices such as smartphones and tables, have historically been largely untargeted efforts because of the lack of identifying information in these channels that makes targeted advertising possible. For example, a consumer browsing to a particular webpage during an online search typically does so without providing any personally identifying information, and consumers are reluctant to reveal such information to all but the most trusted websites and other online providers. Nevertheless, tying these online advertising channels to offline channels would be highly advantageous to retailers and other marketers, since this would allow the marketer to coordinate its marketing efforts across platforms. A marketer could thereby use a more unified, consistent approach in the modern world of multi-channel marketing. The marketer could also much more effectively analyze the results of its multichannel advertising efforts. For example, if such coordination were accomplished, the retailer might be able to better understand the degree to which its online marketing drives offline sales of its products. Thus a marketer who places an online banner advertisement might be able to know how many views of the online banner advertisement actually led to in-store sales at its physical retail locations. This would allow the marketer to more effectively gauge the effectiveness of its various online marketing options, and would thereby result in an advertising marketplace that is more efficient, and better reflects the return on investment for such efforts.

Although the ability to tie offline and online data would thus be highly beneficial to the marketer, the use of offline data in connection with online marketing—most specifically including PII such as name, address, telephone number, and email—creates a risk that the privacy of the consumer may be compromised in the use of this information. Furthermore, because of these important concerns about consumer privacy and in particular the use of PII in online marketing, the use of PII may be prohibited or restricted for certain online marketing applications by applicable laws or regulations, which can vary widely between jurisdictions. Protecting a consumers' online privacy has been recognized as a matter of paramount importance by consumers, governmental entities, individual marketers, and by industry and trade organizations that represent marketers, such as the Direct Marketing Association. Current efforts to improve and better understand the effectiveness of online consumer marketing are thus restricted relative to offline marketing, due to these important limitations on the use of PII for online marketing activities.

Retailers often work closely with marketing services providers in order to improve their marketing efforts. The marketing services providers may have access to large repositories of consumer data, which may include far more information about a retailer's customers than the retailer itself maintains. Such information may enable the marketing services provider to provide data hygiene (i.e., the standardization and deduplication of data) and the enhancement of existing data with additional information valuable in marketing efforts. Such services have long been provided in connection with, for example, direct mail advertising and telemarketing. But bringing this wealth of data into the online world raises important privacy concerns. A method of leveraging all of this data in online marketing, while also ensuring the privacy of personal information about the consumers to whom such marketing is directed, would be highly desirable.

Certain limited efforts have been made in the art to address this disconnection between online and offline marketing, and/or to address concerns about the use of PII for online applications. Some attempts involve the reuse or mild obfuscation of identifiers assigned to consumers and linked to the consumers' PII before putting the identifiers in environments in which the consumers are intended to be de-identified. Because of the reuse of these identifiers, however, these environments do not adequately protect consumers from having their personas re-identified. Examples include using an encrypted identifier into a pixel call; picking up an identifier associated with an individual when logged into a webpage, and then passing that identifier along with site visitation data or ad impression data; and various attempts to use non-dynamic IP addresses.

Many current efforts for identification of online consumers rely on cookies, that is, small files that are written to and stored on a consumer's computer or other device when a particular website is visited. Cookies can contain information that identifies a device used by a consumer without including PII of that consumer. This cookie data is generally nothing more than an identification number. A single consumer may have multiple cookies assigned to their online persona, such as would result from using many different devices while interacting with the online world. Such devices may include a work desktop computer, a home laptop computer, a smartphone, and a tablet, for example. Likewise, a single cookie may actually be associated with multiple consumers, such as two or more people living in the same household who share the use of a single computer. Accurately resolving these cookies to a single instance of a particular consumer may be seen as critical to the success of efforts to use cookies as part of a targeted online advertising effort.

Existing attempts at cookie resolution are often inconsistent and unreliable, because their base system for identifying consumers is not sufficiently accurate. The use of PII to identify a consumer in the context of a cookie is not a workable solution, due to the privacy concerns that have already been described. An effective system for identifying multiple cookies that pertain to the same consumer, but that simultaneously avoids the transmission and/or remote storage of PII in order to protect the privacy of the consumer, would be highly desirable. It may be seen that the problem of cookie resolution is also a factor in analyzing the effectiveness of marketing campaigns; without effective resolution, it is not possible to accurately understand who is actually being marketing to and then attributing a sale (online or offline) to that marketing event. The result is a continuing inefficiency in the marketplace for online advertising, a lower return on investment for marketers, and the delivery of marketing messages to consumers who are uninterested in those messages or find them irrelevant.

BRIEF SUMMARY OF THE INVENTION

The present invention relates generally to an apparatus and method by which marketers may associate their wealth of consumer marketing information with online consumers, but by which no personally identifiable information ("PII") about the consumer is ever made available outside of a protected data environment. Because the PII is thus not exposed, this new approach allows for the advantages of resolution and accurate targeting of marketing messages in an online environment, without the privacy risks that would be associated with the transfer of this type of information. In various aspects, the invention allows online marketers the ability to associate their marketing data to the same consumers they do today, only without the presence of PII. The marketers are able to use this data to show targeted offers to consumers in an online environment, such as webpage banner ads, in a manner that is consistent with the marketing offers the consumer sees in offline channels, such as direct mail. In addition, because the data is being joined consistently across channels, marketers may analyze the impact of marketing campaigns across both "identified" efforts (i.e., using PII) such as direct mail and email, as well as "de-identified" efforts (without access to PII) such as online banner advertising. The result is seamless multichannel marketing, with increased marketing capabilities for the retailer and the delivery of marketing messages that are more likely to be relevant for the consumer, while simultaneously maintaining consumer privacy.

In one aspect of the invention, a marketing service provider maintains a cookie pool and ties one or more of those cookies to an anonymous link. This anonymous link is based on an internal consumer link used by the marketing service provider, but because it is anonymous may be used externally to protect privacy and avoid a distributor or other party from using the identifier in an inappropriate manner. The marketing service provider's cookie pool may then be tied to "foreign" cookie stores, such as those maintained by distribution partners of the marketing services provider. Data may then be uploaded from a marketer's environment (in which PII is maintained) into the marketing service providers' databases, in certain cases being special protected database areas that are de-identified, that is, that contain no PII data. Maintaining this de-identified data separately prevents misuse of PII. That data is then associated with a cookie ID for distribution based on the marketing service provider's cookie pool and the foreign cookie store.

Again in one or more aspects of the invention, identifiers are associated with each of the consumers in the protected environment, but the identifiers are anonymous links specially created for this environment. A hash algorithm is used to ensure that these identifiers may not be used to reconstruct the actual internal consumer link used by the marketing services provider. These special identifiers, in certain embodiments, may also be particularly calculated with respect to each individual partner that uses this data to result in partner-encoded links; in this way, the marketing services provider may prevent multiple partners who use its services from surreptitiously sharing data using the identifiers in a way that would circumvent privacy laws or applicable industry standards. This special encoding further protects the privacy of the individuals about whom the information pertains.

In these various aspects, the invention supports a variety of new business initiatives involving marketing and marketing analytics, as well as continuing to support strong privacy protection as set forth by applicable regulations and best industry practices. The invention allows for the use of PII-based marketing data from the offline world by moving the data into the de-identified online world without including the actual PII. Existing marketing databases, formerly only usable for offline marketing efforts, are thus extended into new channels. Retailers and other marketers may thus leverage their traditional marketing data for online targeting, and they are also able to analyze the impact of their anonymous, online campaigns on sales or other conversion metrics where PII exists, in a way they could not achieve prior to the current invention.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Figure 1:
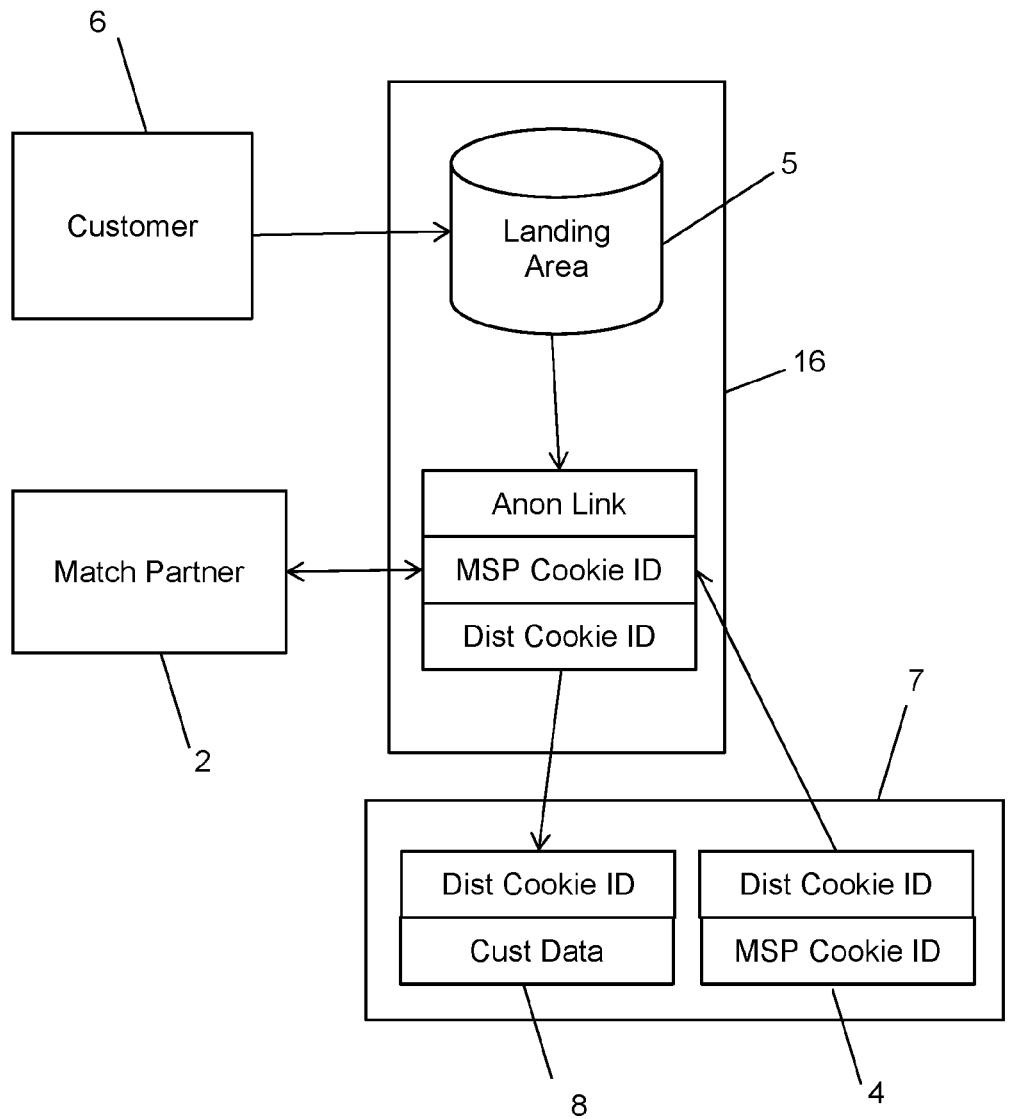
FIG. 1 is a chart of overall steps in cookie matching according to certain embodiments of the present invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In various embodiments, the invention allows for the use of consumer information pertaining to an individual that is based on Personally Identifiable Information (PII) such as name, address, telephone number, and email, but which can be de-identified in a manner that does not allow the data to be re-identified by an outside party. In this way, the data may be used for online marketing without a loss of privacy for the consumer about whom the information pertains. The software, processes and computer hardware utilized for these methods and systems further allow data, once de-identified, to be associated with online cookies for individual consumers. In doing so, the data that originated offline can now be utilized in the online ecosystem to provide a more comprehensive, multi-channel marketing experience. Data from a database that contains PII information may thus be imported into an environment where online, non-PII data is maintained about consumers, such as web browsing, without allowing the PII to be transferred outside of a secure environment.

In one of many possible applications, an automobile brand owner may wish to target its online advertising to those consumers who are currently in the market for an automobile, and whose income would be appropriate to the range of vehicles offered by this brand. It may be seen that the automobile brand does not necessarily need the name of the individual consumers in order to achieve its objectives, but rather requires only that its online advertisements are in fact delivered to those consumers mostly likely to make a purchase based on the identified characteristics. In various embodiments, the invention provides the ability for the automobile brand to target its advertisements to a particular segment (identified, for example, by being in market and within a certain income range) without providing any PII concerning these persons to the marketer. Furthermore, in various embodiments the invention allows for the automobile brand to perform analytics on its marketing campaign, using online advertisement delivery and views, and correlate those accurately to the sales that actually resulted at its dealerships in the offline world, again without providing PII that pertains to the online marketing effort.

The present invention in various embodiments operates in offline and online marketing spaces that include a number of different roles for various providers. Marketing Service Providers (MSPs) are companies that have provided traditional offline database marketing services and often manage the offline prospect or customer databases for large companies. They are typically entrusted with the client's marketing data and the processing of that data, including the ability to recognize consumers based on PII. Match partners are typically companies that have websites or relationships with companies that have websites that collect a consumer's PII, usually in exchange for content, or services (ring tones, coupons, giveaways, ecommerce sites, and the like). These match partners are required to give careful notice to consumers of how their information will be utilized, as well as a choice to opt-out. Distribution partners are typically any online company that utilizes data for targeted advertising or to pass the data on to other online companies that can provide targeted online advertising based on the data. These companies typically are working only with cookies, and cannot or do not want to be exposed to PII about the consumer. Examples include an ad exchange, an ad network, a data management platform (DMP), or demand-side platform (DSP). A reach partner is a company that has the ability to tag many web pages and therefore has an opportunity to do an identifier synchronization of cookies with multiple other companies. A reach partner then facilitates the sharing of IDs between these various companies.

In broad overview, a process according to certain embodiments of the invention may be described with reference to FIG. 1. This figure shows the general relationship between several different parties, with a customer (such as a retailer wishing to place advertisements) at block 6, a restricted-access area 16 maintained by a marketing services provider (MSP) with a landing zone 5, a distribution partner block—such as a DMP or DSP—at distribution partner 7 with internal data association blocks 4 and 8, and a match process managed by the MSP and associated with a match partner at block 2. The match partner at block 2 is used in conjunction with the marketing services provider to create a correlation between cookies that are set on the devices associated with a consumer (such as computers, smartphones, and tablets used by the consumer) and an anonymous link for that consumer, as assigned by the MSP. At distribution partner block 7, a cross-reference table (which may be implemented as two or more linked tables as shown in the steps or a single table) is constructed to correlate the marketing service provider's cookies and the distribution points for the online marketing effort. This step involves the use of a "foreign" cookie pool (such as from a distribution partner providing a DMP or DSP) that contains cookies linked to the provider cookie pool cookies. From customer block 6, data is uploaded from a retailer or other marketer's PII-based consumer databases into a privacy compliant, de-identified environment designed specifically for online marketing while protecting privacy, initially being directed to landing zone 5. At data association block 8, the marketing service provider associates the now de-identified data within the secure area 16 with a cookie for the distribution point by utilizing the provider cookie pool and the foreign cookie pool. Each of these steps will be described in more detail, along with variations of this process as called for in various embodiments, below.

Anonymous links used in the uploaded, non-PII area of MSP block 16 allow data to be passed from the PII environment to the non-PII environment and correctly overlaid in the non-PII environment to the same consumer, only with no personally identifiable elements that will connect the data to the identity of the consumer. The anonymous link is created through a number of one-way, secure, and irreversible transformations utilizing a multi-step process and standard cryptographic functionality as set forth herein. These processes make it theoretically, let alone practically, impossible to reconstruct the original identifier consumer link from the anonymous link by a party outside of the marketing services provider. Data may thus be correlated with a particular individual for online marketing purposes, but the identity of that individual cannot be determined based on the information that is provided for online marketing.

Figure 2:
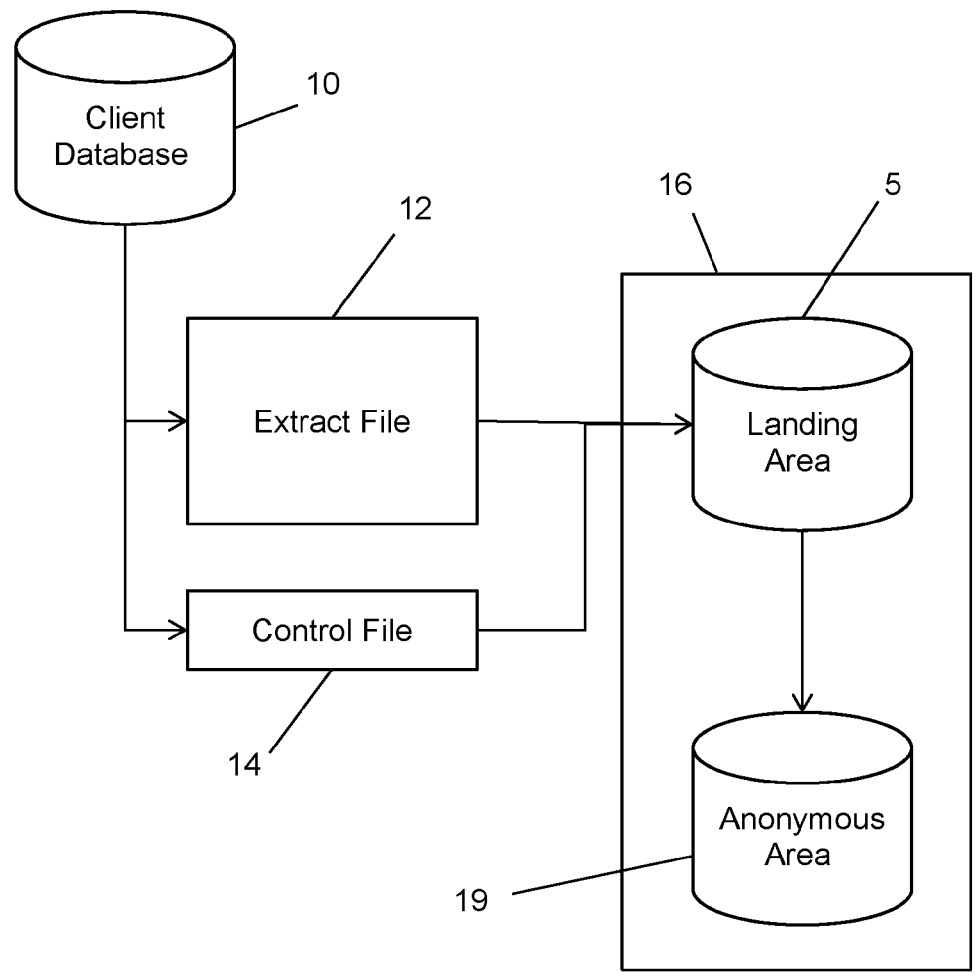
FIG. 2 is a schematic illustrating elements for uploading customer information in a system according to certain embodiments of the present invention.

Referring now to FIG. 2, the process for receiving client data (as from a retailer or other advertiser, for example) from a PII-based system of the client and loading that data into a non-PII environment for online marketing (as generally described above with reference to FIG. 1) may be described in greater detail. Client PII-based database 10 may be any of many different types of marketing databases that contain information concerning consumers, such as customers or prospective customers of retailers or other marketers. Such databases are commonly maintained by retailers and other marketers in order to keep track of information about their offline customers. Client PII-based database 10 may contain various types of information concerning these consumers that is personally identifiable, such as name, address, telephone number, or email address.

In a first step of the process for moving information about such customers into an environment that is secure for online marketing, an extract file 12 is constructed that contains information concerning all or a subset of the consumers about whom data is maintained in client PII-based database 10. Various data elements may be included in extract file 12, based on the application for which the data is provided, for example age, gender, marital status, income level, or purchase history.

The data in extract file 12 may be structured, in certain embodiments, in a typical format in which the file consists of a large number of records, each record pertaining to a particular customer, and each such record being divided into multiple fields that each contain a certain type of information about the customer associated with the record. Alternatively in certain embodiments, the data in such records may be taxonomized, either prior to processing as described herein or as part of the processing of pulling the data from a traditional field format into a taxonomized format. Taxonomizing is the replacement of typical field names and positions with standardized IDs that pertain to particular data and are generally known to the parties that are utilizing the data. For example, male gender may be taxonomized as "3001," and an income of $75,000 per year may be taxonomized to "13027." It may be seen that by using taxonomization, the data is no longer reliant upon field position or the knowledge of any particular fields or data format, as long as the taxonomy IDs are known to each party using the data. Thus the data may be presented in any order in the records. Taxonomization has been shown to improve file processing speeds, which is particularly important on very large files that contain a large number of consumer records with many data points concerning each consumer.

In addition to the other data in the records of extract file 12, whether taxonomized or in a standard format utilizing fields, one or more consumer links may be supplied for each customer record in order to uniquely associate the data that pertains to a particular customer in a record with that customer's identity. Various types of consumer links may be used in various embodiments of the invention. These consumer links may be fields that comprise numbers, alphanumeric characters, or any combination in various embodiments. In one example, the consumer links may be those as used in the AbiliTec consumer linking product offered by Acxiom Corporation. The AbiliTec linking system providers an identifier that is unique across a universe of consumers, such as, for example, all consumers in the United States. There are identifiers in the AbiliTec linking system that uniquely identify particular consumers (AbiliTec Consumer Link) and particular addresses (AbiliTec Address Link) as well as households (AbiliTec Household Link), and the connection between a consumer and an address over time may be represented by connections between these types of identifiers. (For purposes herein, "consumer link" will generally refer to all types of possible links, including but not limited to all types of AbiliTec links, including the AbiliTec Consumer Link, AbiliTec Address Link, and AbiliTec Household Link.) Using these types of associations, each identifier may be uniquely associated with a particular consumer, regardless of whether there are multiple records that contain information about that individual consumer. Multiple records that contain information about the same consumer or same address are those associated by the fact that they are both linked to this same consumer link. This allows the system to accurate determine that two records actually pertain to the same individual consumer, such as a consumer who has moved or changed names due to marriage. If the data in client PII-based database 10 is not already linked with AbiliTec identifiers or other such consumer links due to earlier processing, then those may be applied to the data in each record that is to be included in extract file 12, either before or after extract file 12 is constructed. The use and construction of AbiliTec identifiers, and the association of those identifiers with consumer data, is described in U.S. Pat. Nos. 6,523,041 and 6,766,327, which are each incorporated by reference as if fully set forth herein.

In various embodiments, a control file 14 may also be constructed along with extract file 12. The purpose of control file 14 is to provide instructions for the automatic processing of data from extract file 12 by the provider offering the services described herein. For example, it may specify the meaning of PII fields in extract file 12 and/or contain taxonomization instructions for the data elements in extract file 12. In alternative embodiments, control file 14 may be incorporated with extract file 12, or may be omitted in lieu of other forms of instructions from or related to the client who maintains client PII-based database 10 to the provider offering these services. Both extract file 12 and control file 14 may be sent by any of numerous known means, including by electronic transfer of the file over a network connection, such as by transfer over the Internet.

Once extract file 12 is created from client PII-based database 10 and control file 14 is prepared, the marketing services provider receives extract file 12 into restricted-access area 16. Restricted-access area 16 may be implemented as a database or multiple databases in any of many known forms of computer storage media. The purpose of restricted-access area 16 is to provide a secure data storage facility where data can be manipulated without the use of PII in order to ensure the privacy of data used in, for example, online marketing transactions. The data from extract file is initially received in landing zone 5 of restricted-access area 16. Landing zone 5 provides are area where PII may be removed from the data before it is passed into an area where PII is not allowed for further processing. In certain embodiments, the data may at this point be analyzed to determine if AbiliTec identifiers or other consumer links are present, and if not, then the data may be cleaned, standardized, and processed to receive consumer links. The records in this data will then be appended with the consumer link for each consumer in such case. Once this is completed, the data is stripped of all PII other than the consumer links. In this way, the data is made ready for further processing in the anonymous area 19 of restricted-access environment 16, where no PII is allowed in order to fully protect consumer privacy.

Although all PII other than the consumer links has now been stripped out of the consumer records, the consumer links themselves may pose a risk because they are used internally by the marketing services provider to link data associated with a particular individual. The consumer links are in these systems associated with PII for the consumers about which they pertain. A party wishing to maliciously reconstruct PII from data in anonymous area 19 might thus use the consumer links in an effort to achieve this objective. In order to prevent any possible misuse of the consumer links by a party that might wish to surreptitiously identify the consumers associated with each of the records, these consumer links are modified in a manner to prevent any such misuse. The process results in the creation of an anonymous link from each consumer link. The anonymous link is a de-identified link that is privacy friendly and completely anonymous, because it is not stored in any systems anywhere, either within the marketing service provider's systems or outside of them, in conjunction with a name, address, telephone number, email address, or other PII associated with a consumer, and further cannot be reverse engineered to an identifier that is stored in any database with PII for a particular consumer.

Figure 3:
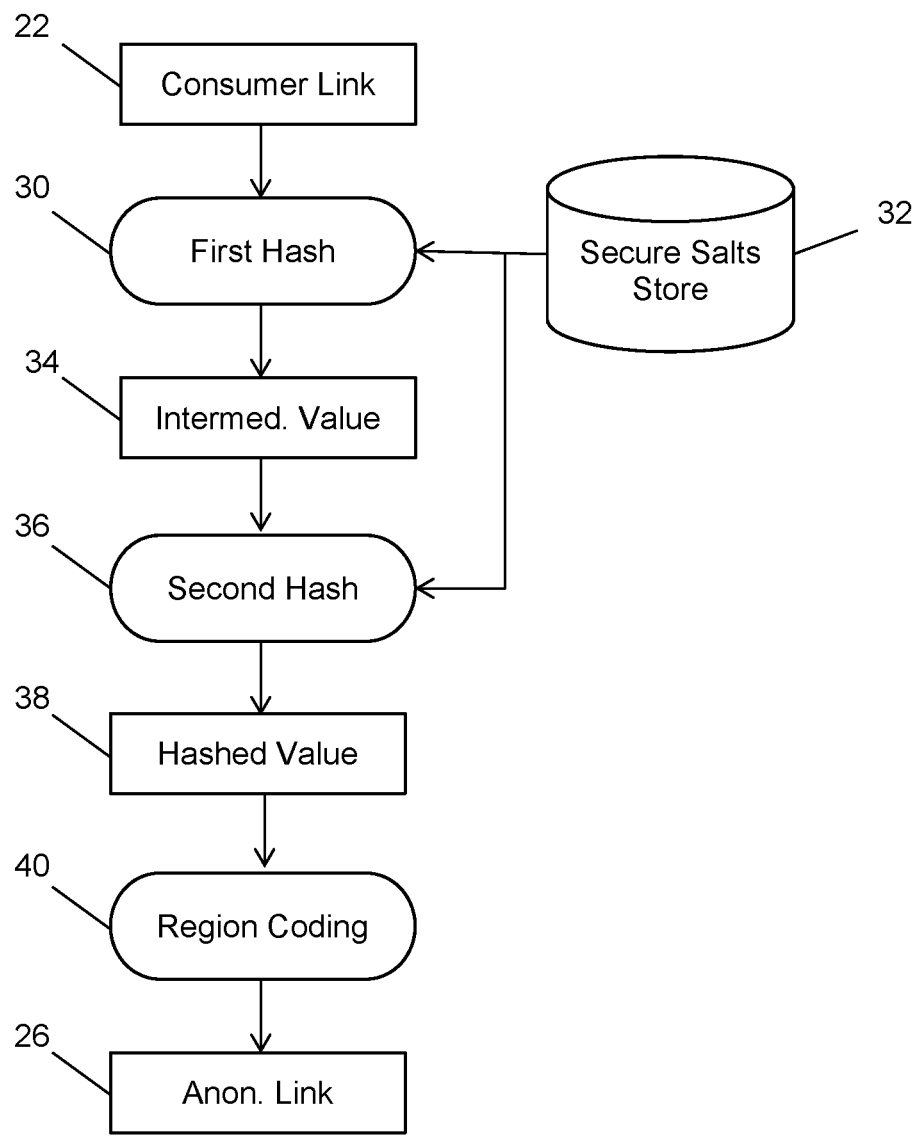
FIG. 3 is a flow chart illustrating the construction of an anonymous link according to certain embodiments of the present invention.

In certain embodiments, the anonymous link is created from a consumer link in a process as illustrated in FIG. 3. Consumer link 22 may, in this particular embodiment described, be a 16-character alphanumeric string. In a first step, consumer link 22 is provided as input to a hash function at step 30, using a secure salt from secure salts store 32. As is known in the art of cryptography, a salt is a random string or other data that is used as an additional input to a one-way hash function. One-way hash functions are likewise well known in the art. The purpose of using a salt is to prevent certain types of attacks that may be used if this random element is not added to the one-way hash function. Various hash functions may be applied at step 30, including in certain embodiments the standard SHA-1 hashing function, as published by the National Institute of Standards and Technology (NIST). The result is intermediate value 34.

In second hash step 36, a second secure salt from salt store 32 is used to again apply a one-way hashing algorithm, this time being applied to intermediate value 34. Various hash functions may be applied at step 36 as are known in the art, including the application of SHA-1 in this second hash step as well as the first hash step. The output of this step is hashed value 36, which in certain embodiments may be a 20-byte hash, which is then converted and stored as a base-16 encoded, 40-character alphanumeric string. Although two one-way hash functions are applied in this particular embodiment, the invention is not so limited, and may utilize only a single hash or be extended to the application of any number of hash functions.

In order to utilize this process in global marketing efforts while simultaneously keeping identifiers separate for particular regions, an optional region code step 40 may be conducted, in which a regional code identifying a region (such as a particular country) may be applied to hashed value 38. In certain embodiments, this is a two-character code that is prefixed to hashed value 38 as a concatenation. The final result is anonymous link 26, which in certain embodiments is a 40-character (or, in the case of a regional code being prefixed, 42-character) alphanumeric string. For example, a consumer link 22 for initial processing could be "0000US01ABCDEFGH," and the resulting anonymous link could be "183FC2C3A760B11C863856A46C2DEDBECC21512-345."

It may be noted that the salts from secure salts store 32 are secure in certain embodiments because they are stored in the system configuration in an encrypted form; the encryption is certain embodiments is password-based AES, with the password hidden within the programming code, so that it would be impossible for a layperson or an intruder to see the password. It will be apparent from the process described herein and illustrated in FIG. 3 that the two encrypted salts from salt store 32 are the only external parameters needed to generate an anonymous link 26 from a consumer link 22.

Taxonomization, as described above, may in certain embodiments be performed on records 20 at this point after the anonymous link 26 is created for each record. Control file 14 may optionally contain instructions for providing taxonomization processing to the records, such that data that is values distributed in columns or data in standard data fields is turned into order-independent numeric data through the taxonomization processing.

An optional step in certain embodiments once anonymous links 26 are created is to randomly sort the records such that they are presented in an order that is different, and unmatchable, to the order that the records were originally provided into the restricted access area 16. This is a further security measure to prevent a party that obtained access to both the input and output versions of extract file 12 from being able to compare them and re-identify the data that is now associated only with the anonymous links 26 and no PII data.

In the match partner processing as described above with reference to FIG. 1 and explained in greater detail below, it is desirable in certain circumstances to produce an identifier that is not only anonymous, but is encrypted in a way specific to a particular partner of the marketing services provider. Such identifiers will be referred to herein as partner-encoded links 50. Partner-encoded links 50 may be used for the purpose of matching information pertaining to a consumer without the real-time exchange of PII about that consumer, just as with anonymous links 26. The use of identifiers that are encoded differently for specific partners allows the marketing services provider to work with particular partners who do not wish to send PII of specific consumers out of their particular data environment, or are prohibited by applicable laws or regulations from doing so. The use of partner-encoded links 50 also allows clients of the marketing services provider to store their anonymous data for analysis in databases unique to them, and with anonymous links 26 that could not be tied to another client's data inadvertently. As will be seen, applied randomization achieves the result that two identical anonymous links may map into two wholly different partner-encoded links 50; they may both be decrypted, however, to the same anonymous link 26. The encryption preferably uses standard cryptographic functionality such as 128-bit AES encryption. To ensure the security of the encryption keys, these are also encrypted prior to storage.

Figure 4:
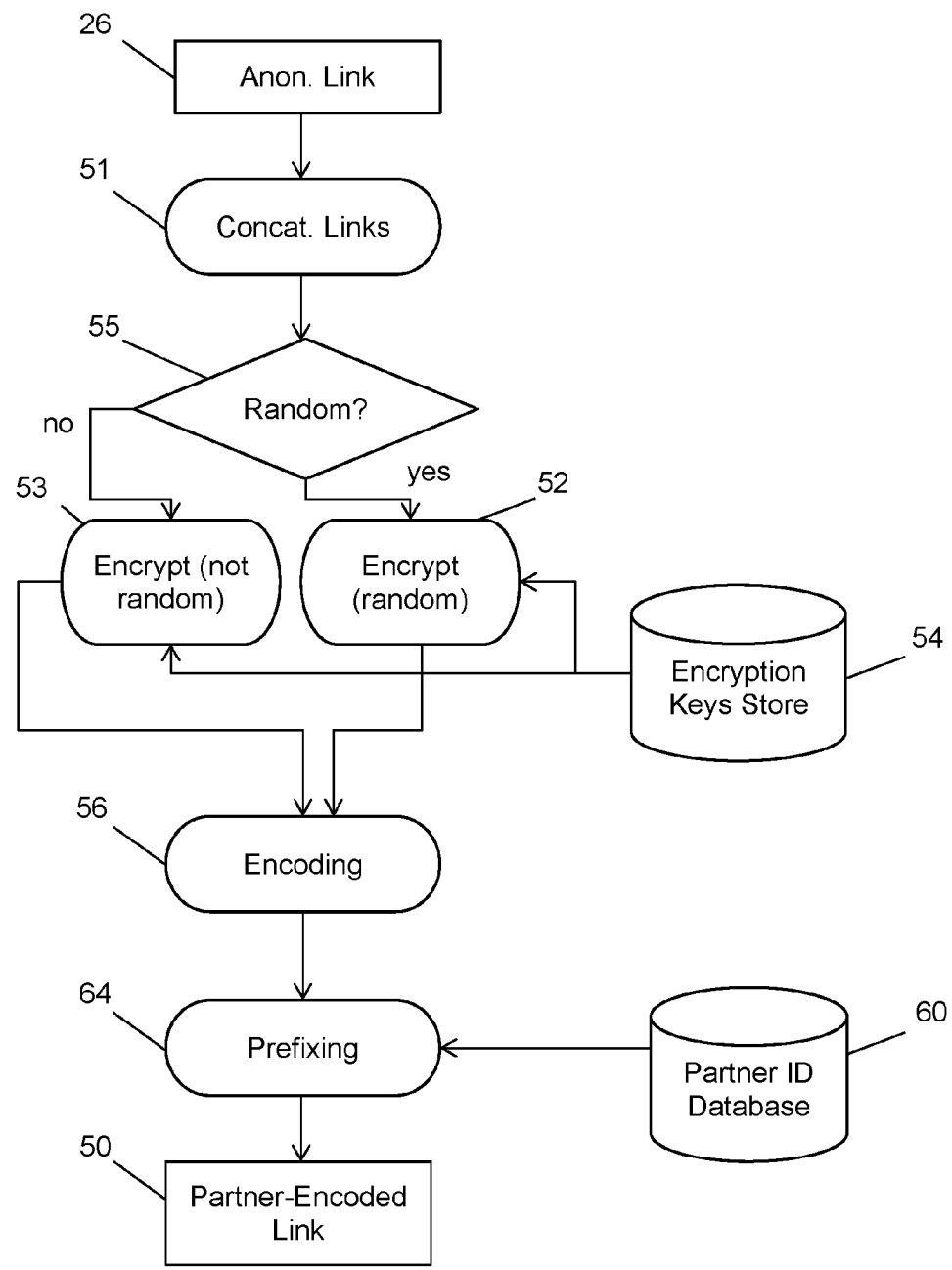
FIG. 4 is a flow chart illustrating the construction of a partner-encoded link according to certain embodiments of the present invention.

In certain embodiments, the process for creating partner-encoded links 50 is as set forth in FIG. 4. The partner-encoded link 50 may be constructed either from a single anonymous link 26 or from multiple anonymous links, as in the case of an identifier for a consumer and for an address associated with that consumer (e.g., an AbiliTec Consumer Link and AbiliTec Address Link). If two anonymous links 26 are to be used, then they may be concatenated together as binary strings at step 51. A special byte may be added to the concatenation in order to identify the type of anonymous link 26 that is being supplied to the process, e.g., consumer-type link only, or both consumer and address link.

The partner-specific encryption key that corresponds to the partner for which this data will be used is read from partner-specific encryption keys store 54. These encryption keys are created prior to processing. At step 55, it is determined if the encryption will include a random initialization vector, which are generated as needed. Use of the random initialization vector will result in a different partner-encoded link 50 from the anonymous link 26 each time the process is performed. There may be cases, however, where this is not desirable, such as where the partner-encoded link 50 is serving simply as a disguised anonymous link 26, and it is important that the same partner-encoded link 50 be generated with each processing. Encryption occurs at step 52 for the case of a random encryption result, or at step 53 for the non-random result, in either case using the appropriate encryption key from partner-specific encryption keys 54.

At encoding step 56, the result of encryption is encoded using the standard Base64, URL-safe codec. In the event of a single anonymous link 26, the result will in certain embodiments be a 43-character string, while with two underlying anonymous links that were concatenated as described above, the result will be a 64-character string. A partner ID from partner IDs database 60 is then prefixed to this string at prefix step 64. The purpose of the partner ID is to uniquely identify this partner from the universe of all possible match partners. If an initialization vector was used, it is also prefixed to the result. The partner ID and initialization vector are necessary in order to make decryption of the partner-encoded link 50 possible. The final result is either 49 or 70 characters long in certain embodiments. In a particular illustrative example, the anonymous link 26 may begin as the character string 183FC2C3A760B11C863856A46C2D5DBECC21BF251-2345, and the resulting partner-encoded link 50 may be the character string QE1005HX1fqX1cljgWLFwL-GrBY92f3NO5FEdpPaouxQ0a5qEE. In this case, "QE" is the initialization vector and "1005" is the partner ID.

Figure 5:
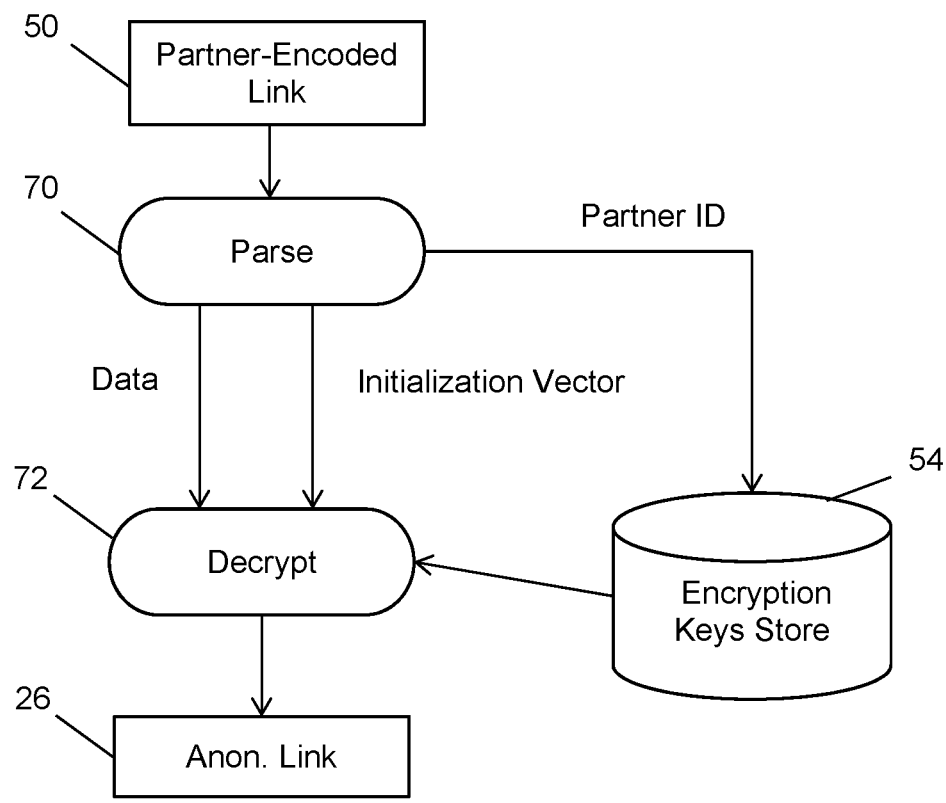
FIG. 5 is a flow chart illustrating the recovery of an anonymous link from a partner-encoded link according to certain embodiments of the present invention.

FIG. 5 illustrates the process of recovering the anonymous link 26 from the partner-encoded link 50. At step 70, the partner-encoded link 50 is parsed to pull out the partner ID, initialization vector, and base data. The partner ID is used to select the appropriate encryption key from partner-specific encryption keys database 54. This data, along with the initialization vector, is sent to decrypt step 72 in order to perform standard decryption techniques to recover the base data for anonymous link 26. In the case where two or more anonymous links 26 have been concatenated to construct partner-encoded link 50, the special byte for this information will have been read in order to correctly identify the resulting data. Thus partner-encoded link 50 may be decrypted back to the corresponding anonymous link 26 using the appropriate encryption key; the underlying consumer link 22, however, cannot be recovered because that data cannot be recovered from anonymous link 26 due to the algorithm used for constructing anonymous link 26, as set forth previously.

Figure 6:
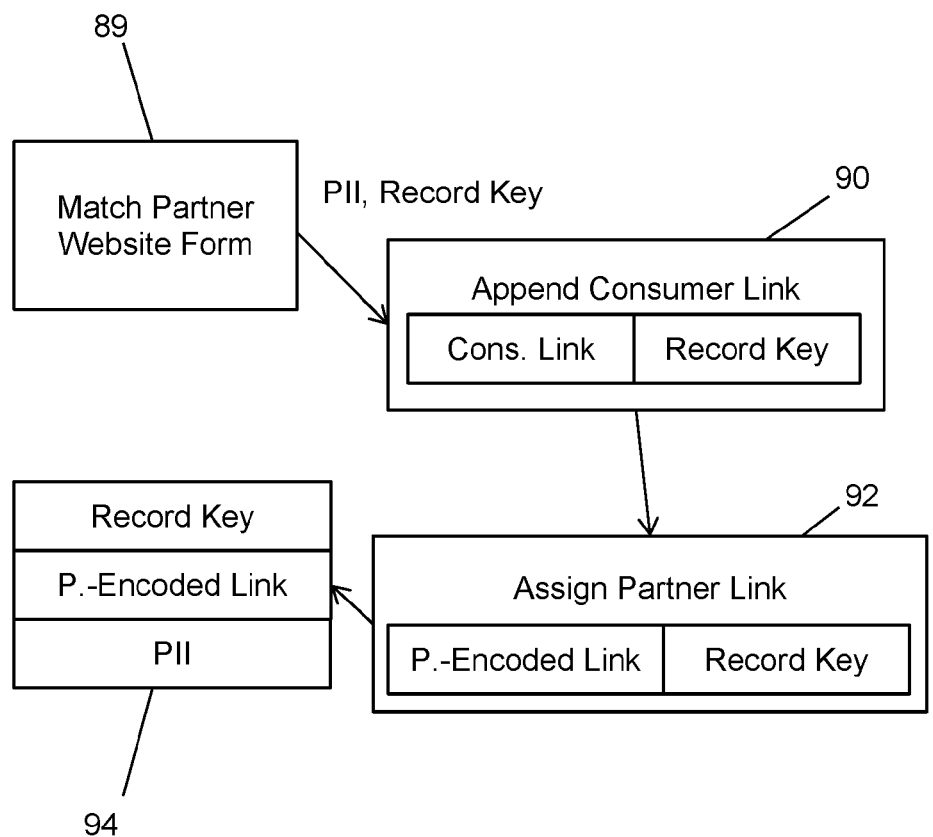
FIG. 6 is a chart illustrating the assignment of partner-encoded links to match partner data according to certain embodiments of the present invention.

Referring now to FIG. 6, the process of building the marketing services provider cookie pool through match partners may begin to be described in more detail. In a particular example, the marketing services provider has a number of "match" partners, that is, partners that collect or provide PII for various purposes. This information is collected under applicable privacy rules and with appropriate notice to the consumer at, for example, websites operated by the match partner and visited by the consumer. This may, for example, be a form presented to the consumer by the match partner at match partner website form 89. The match partner sends a file in batch mode that contains its consumer records, including PII data entered by consumers at match partner website form 89, along with the match partner's internal record key for each of the consumers. The internal record key is the means by which the match partner distinguishes its consumers within its own internal systems. At step 90, this information is received by the marketing services provider, and the appropriate matching is performed in order to append the appropriate consumer link to each of the records. In this way, a consumer link is associated with each of the partner's record keys at the marketing services provider. The PII may now be dropped since the marketing services provider no longer needs it for matching once the consumer link is assigned. The anonymous link for each consumer link is calculated as described above, and at step 91 the anonymous link is encrypted to create a partner-encoded link. The result at step 91 is an association between each of the match partner's internal record keys and a partner-encoded link created by the marketing services provider. A file with this association is then returned to the match partner from the marketing services provider, such that at step 94 the match partner may use this file to associate the PII kept internally within its systems to a partner-encoded link using the associated record keys. The result of this processing is that the match partner now has partner-encoded links assigned to each of its internal customer records, to facilitate further processing.

Figure 7:
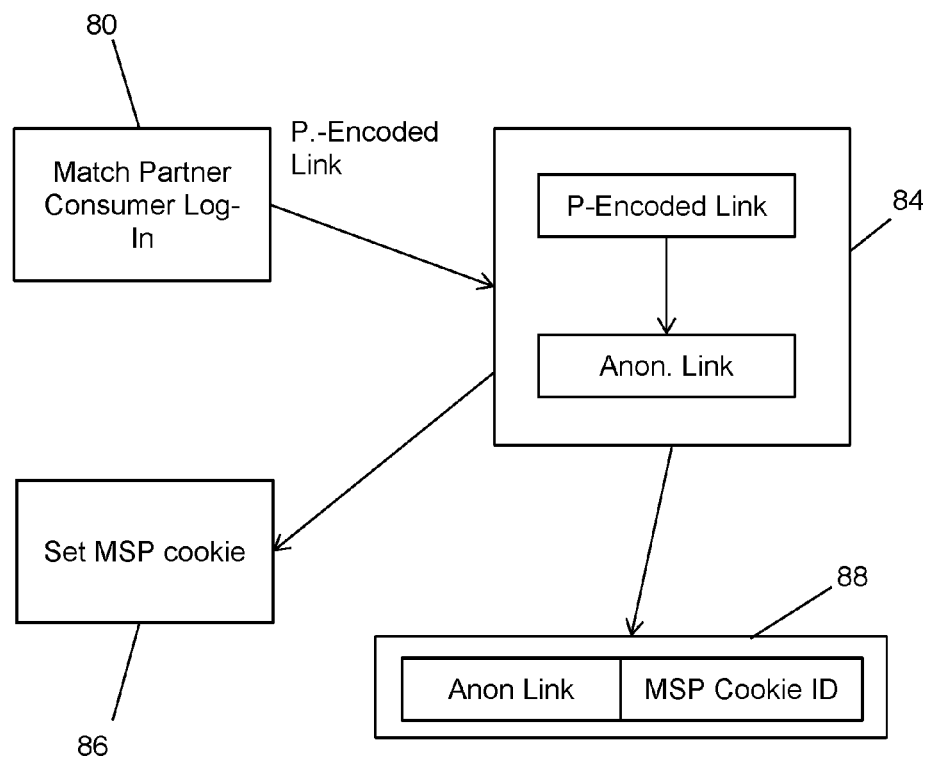
FIG. 7 is a chart illustrating the steps in applying partner-encoded links to match partner data according to certain embodiments of the present invention.

Real-time processing utilizing the partner-encoded links that are now overlaid onto the match partner's data may be described with reference to FIG. 7. At block 80, the match partner interacts with a consumer, such as a consumer that logs into an account with the match partner. Operating now in real time, the match partner sends the associated partner-encoded link for that consumer to the marketing services provider. At step 84, the marketing services provider converts the partner-encoded link back to the associated anonymous link. At step 86, the marketing services provider then looks for the presence of one of its cookies on the consumer's device, and if there is no cookie there then it sets a cookie that contains the anonymous link for that consumer. This processing takes place in real time and in a way that is transparent to the consumer so that the web browsing experience for the consumer is not negatively impacted. A cross-reference table 88 is accessed to track the correlation between an MSP cookie ID for the cookie that was set on the consumer's device and the anonymous link for that consumer. It may be seen that in this manner a linking is provided in real time to allow online marketing to be delivered to that consumer, but no PII is used, and once the partner-encoded links are set on the match partner database, no PII need be sent to any retailer or other marketer in order to allow this matching and the resulting targeted online advertisement to occur.

Figure 8:
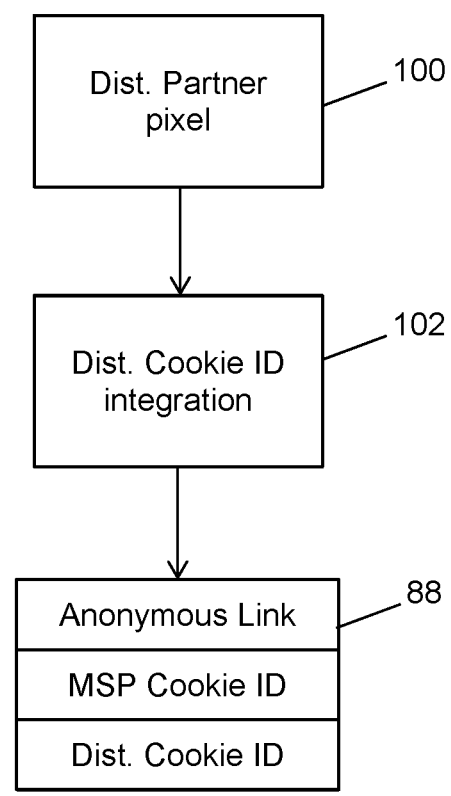
FIG. 8 illustrates cooking synchronization using a distribution partner according to certain embodiments of the present invention.

Referring now to FIG. 8, the integration with distribution partners for the marketing services provider may be described. At step 100, a consumer visits a website or views an online advertisement that contains a web beacon, pixel, script, or other data or code maintained by a distribution partner that provides for the placing of a cookie on the consumer's device. The distribution partner then pushes its cookie at step 102 for inclusion in cross-reference table 88, thereby expanding the table to include not only the anonymous link and MSP cookie ID for the cookie that was set as described in FIG. 7, but also the distribution partner cookie ID, such that there is now an association between the MSP cookie and the distribution partner cookie for a particular consumer. In certain embodiments, this synchronization of cookies between the marketing services provider and distribution partner allows for the marketing services provider to send a batch file containing the associations between these cookies to the distribution partner on a periodic basis, such as nightly.

Figure 9:
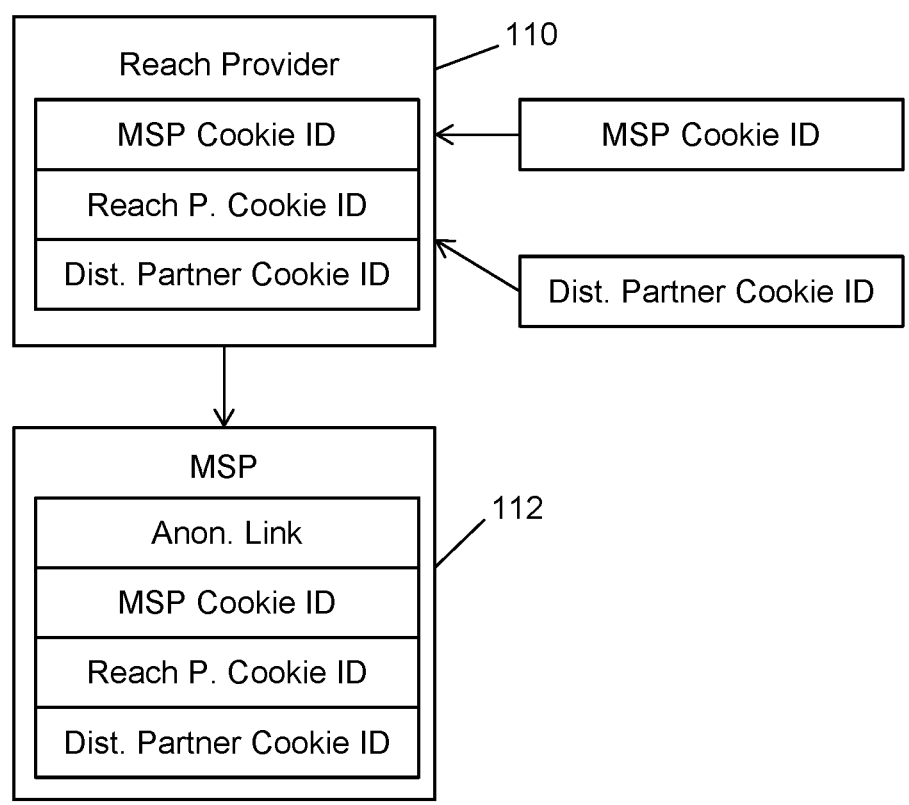
FIG. 9 illustrates cookie synchronization using a reach partner according to certain embodiments of the present invention.

It may be seen that the ability of this process to produce meaningful results relies upon the overlap between the marketing services provider and the distribution partner; the greater the overlap in their cookie pools, then the more effective this process will be at ultimately delivering targeted advertisements that are meaningful to the consumer. To help increase the overlap between the marketing services provider cookie pool and distribution partner cookie pools, a reach partner may be utilized as shown in FIG. 9. Reach partners may see a very large amount of web-traffic on a daily basis, thus increasing the effective overlap with the distribution partner. At step 110 the reach partner receives cookie IDs from both the marketing services provider and distribution partner, and creates a reach partner cross-reference between each set of IDs. Those are matched to the reach partner's own cookie ID that corresponds to these IDs, and this data is used at step 112 to further expand the marketing services provider cross-reference table 88 by showing the correlation between existing marketing service provider cookie IDs and distribution partner cookie IDs.

Figure 10:
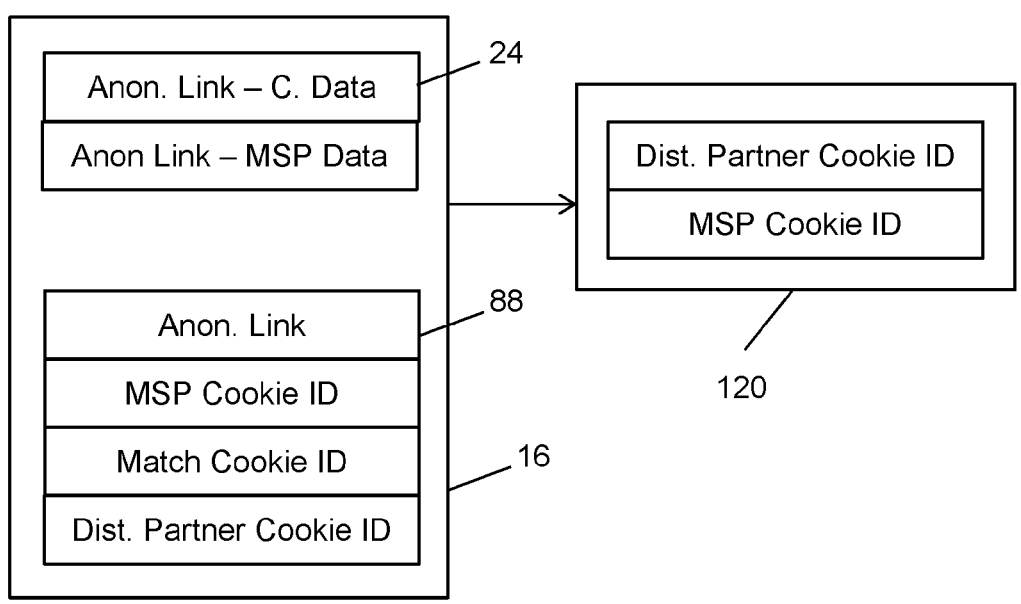
FIG. 10 illustrates the distribution of data through a distribution partner according to certain embodiments of the present invention.

The foregoing processing enables the pushing of data from restricted-access area 16 to a distribution partner as shown in FIG. 10, utilizing all of the available data but without any PII being distributed to the distribution partner. The new complete cross-reference table 88 at the marketing services provider developed in processing previously described is used to lookup the distribution partner cookie for a particular device, and the result is the corresponding anonymous link. Using the anonymous link, data from anonymized record 24 can be sent with the associated distribution partner cookie back to the distribution point at step 120. This allows for targeted advertising to a particular consumer, who is associated with the device from the distribution partner cookie, but without transmitting any PII concerning that particular consumer to the distribution partner. The distribution partner receives data that allows for targeting, such as for example age, gender, income, or the like, which is useful for generating targeted advertising, but without the PII associated with the data (a name, address, telephone number, or email address, for example). Thus there is no loss of privacy for the consumer.

Figure 11:
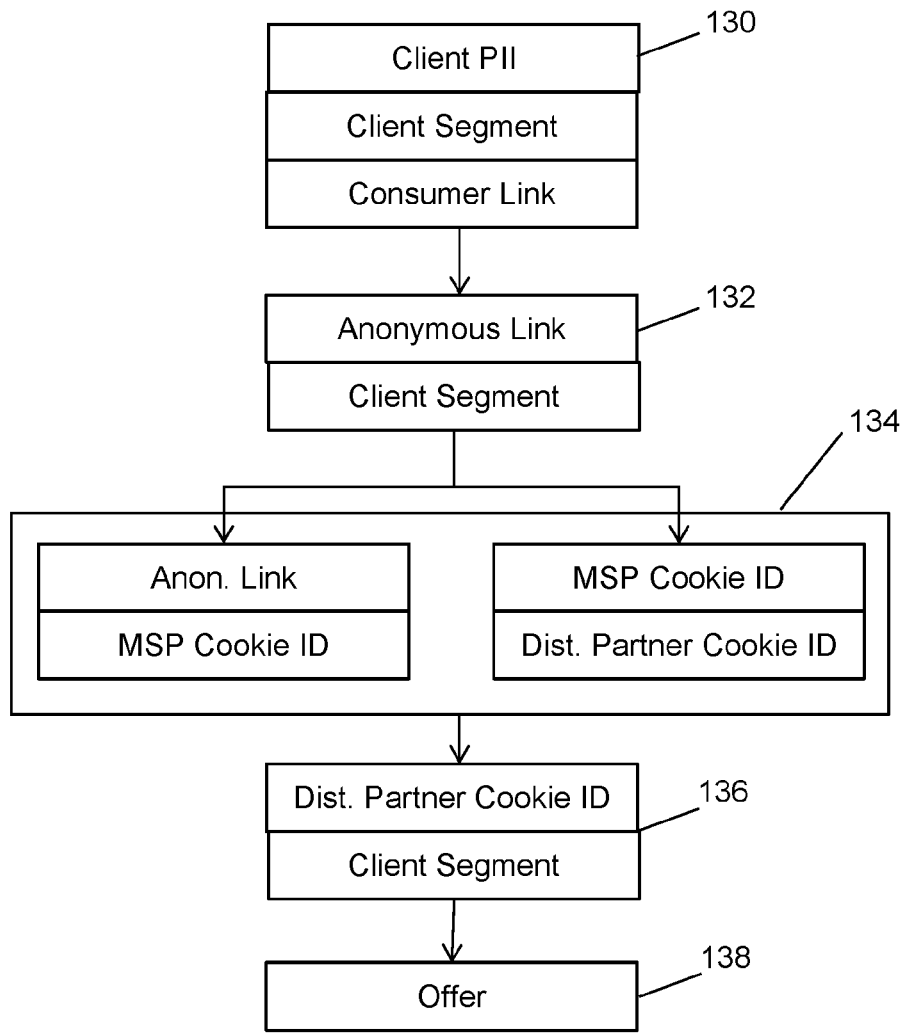
FIG. 11 illustrates the targeting of advertisements according to certain embodiments of the present invention.

FIG. 11 illustrates the manner in which targeted advertising may be achieved using the various components now described without revealing PII to the distribution partner and thereby protect the privacy of the consumer. At step 130, the "onboarding" process begins as a file is received that relates the client PII, certain data segments about that client (that may be relevant to a targeted advertisement), and the matched consumer link. When moved into the restricted access area 16 at step 132, this allows association of the anonymous link 26 for each of these consumers with the segment data. At step 134 cross-reference table 88 as previously described is used to associate anonymous link with a cookie placed by the marketing services provider, and also to connect that cookie with the partner's cookie for that data. At step 136, the output to the distribution partner is simply the match between the partner's cookie and the particular client segment. Using this data, when that partner cookie is recognized on a website by the distribution partner, the offer associated with that particular client data segment can be displayed on the device of that particular consumer. In certain embodiments, an initial set-up of this process for a particular partner will be a file with all cookies that the marketing services provider has seen in a certain prior period, such as ninety days. Subsequent files will contain new cookies seen on a recurring basis, such as daily, or existing cookies that are seen again.

Figure 12:
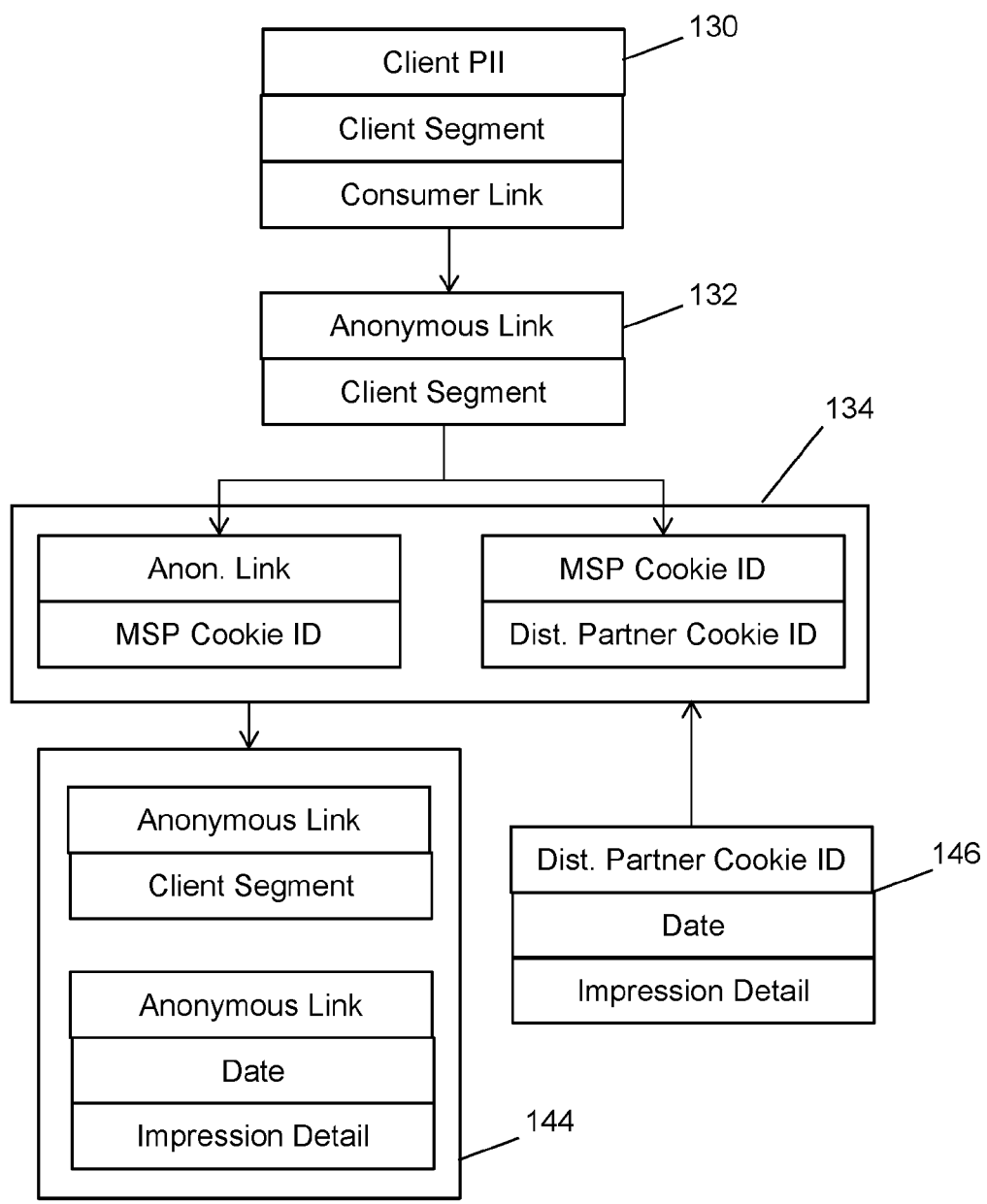
FIG. 12 illustrates data analytics according to certain embodiments of the present invention.

FIG. 12 illustrates the process of performing analytics utilizing the processes and methods of various embodiments of the invention. It may be seen that overlap of client data and advertisement-serving data may be achieved utilizing the marketing service provider's cookie pool and the cross-reference built during the cookie synchronization process. At step 130, data received from a client is anonymized is, as before, passed along to step 132 where it is associated with the anonymous link 26 for such data. At step 146, ad server data is pulled from the partner, which includes information such as the partner's cookie, the date on which the ad was served, and various impression details such as clicks or actions. Using cross-reference table 88, it is possible at step 134, as explained with respect to FIG. 11, to match the appropriate anonymous link to the ad server data for this particular client. Analytics is then performed at step 144, where the corresponding anonymous link is matched to the ad serving information. All of the analytics takes place within the restricted access area 16, and thus no PII is used in the matching process. As a result, the marketing services provider may deliver powerful analytics to its customers across online channels even though no PII is used in this processing.

It may be noted that there may be a many-to-many relationship of anonymous links to cookies in the various embodiments. In the case where there are many anonymous links associated with a single cookie, which corresponds to the case of numerous individual consumers using a single device, in certain embodiments the latest individual seen will be used to associate data to that cookie. In the case where one anonymous link is associated with many cookies, indicating a single individual using multiple devices, then this individuals' data will be associated with each of the cookies tied to it.

It may be noted that the various embodiments of the invention do not in all cases require the particular order shown in the illustrated embodiments, or necessarily require any sequential order, to achieve desirable results. In addition, other steps may be provided, or steps may be eliminated, from the illustrations, and other components may be added to, or removed from, the described systems.

Each of the various systems as used in communication with the marketing services provider, distribution partner, match partner, reach partner, and other parties may be implemented as standard computer servers or groups of servers, as are well known in the art. These machines may be specially programmed with software to implement the algorithms as described herein, the result being special-purpose computing machines. These machines may be connected together using networks such as the Internet. Standard web browser software or other software used to access the Internet from various client devices may be used. Such devices include desktop computers, laptop computers, smartphones, and tables, as non-limited examples.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain embodiments that are intended to be exemplary only and not limiting to the full scope of the present invention, as set forth in the appended claims.

The invention claimed is:

1. A method for linking match partner data, comprising the steps of:
   a. receiving at a marketing services provider (MSP) server a consumer record comprising personally identifiable information (PII) related to a consumer;
   b. assigning a consumer link to the consumer record;
   c. associating a partner ID with the consumer link and the consumer record;
   d. calculating an anonymous link from the consumer link, wherein the step of calculating an anonymous link comprises the step of applying a hash function to the consumer link whereby the anonymous link is not derivable from the consumer link;
   e. reading from a partner-specific encryption keys database in communication with the MSP server a partner-specific encryption key;
   f. encrypting the anonymous link using the partner-specific encryption key; and
   g. concatenating the encrypted anonymous link with a partner ID to produce a partner-encoded link.

2. The method for linking match partner data of claim 1, wherein the anonymous link comprises an anonymous consumer link and an anonymous address link concatenated to the anonymous consumer link.

3. The method for linking match partner data of claim 2, wherein the anonymous link further comprises a special byte to identify the type of anonymous link.

4. The method for linking match partner data of claim 1, further comprising the steps of:
   a. at the MSP server, parsing the partner-encoded link into the partner ID and base data;
   b. utilizing the partner ID to select one of the partner-specific encryption keys from the partner-specific encryption key database; and
   c. utilizing the selected partner-specific encryption key, decrypting the base data to produce the anonymous link from the partner-encoded link.

5. The method for linking match partner data of claim 4, wherein the step of parsing the partner-encoded link further comprises the step of parsing the partner-encoded link to recover an initialization vector, and utilizing the initialization vector along with the selected partner-specific encryption key to decrypt the base data and produce the anonymous link.

6. The method for linking match partner data of claim 5, wherein the step of parsing the partner-encoded link further comprises the step of parsing the partner-encoded link to recover a special byte, and utilizing the special byte to identify a type for the anonymous link.

7. The method for linking match partner data of claim 6, wherein the step of encrypting the anonymous link to produce the partner-encoded link comprises the step of concatenating the initialization vector to the partner-encoded link.

8. A system for matching and analyzing offline and online data while protecting consumer privacy, comprising:
   a. a restricted access data storage area, comprising a landing area and a secure storage area;
   b. a client database in communication with the restricted access area, the client database comprising records for a plurality of consumers, each record comprising at least one consumer data segment and a consumer link;
   c. a marketing services provider (MSP) comprising:
      i. a matching processor configured to receive from a match partner a partner-encoded link for a consumer, identify in the restricted access area an anonymous link correlated with that consumer, correlate that anonymous link with the partner-encoded link for that consumer, and write to a device used by that consumer a marketing services provider (MSP) cookie; and
      ii. an onboarding processor configured to receive an extract file from the client database comprising client data and the consumer link for each record, calculate an anonymous link from the consumer link, and strip out all personally identifiable information (PII) from the record to store the record in the secure storage area of the restricted access data storage area;
   d. a plurality of cross-reference tables, wherein each cross-reference table links the anonymous link for each record in the restricted access data storage area with the MSP cookie matched to such record; and
   e. a distribution partner in communication with the MSP, and wherein at least one of the cross-reference tables further links a distribution partner cookie with the matched MSP cookie and anonymous link.

9. The system for matching and analyzing offline and online data while protecting consumer privacy of claim 8, further comprising a reach partner in communication with the MSP, and wherein at least one of the cross-reference tables further links a reach partner cookie with the matched distribution partner cookie, matched MSP cookie, and anonymous link.

10. The system for matching and analyzing offline and online data while protecting consumer privacy of claim 9, wherein at least one of the anonymous links is mapped to a partner-encoded link.

11. A method for supporting the placement of a targeted online advertisement for a consumer associated with a device, the method comprising the steps of:
   a. receiving from a client a client record, the client record comprising client personally identifiable information (PII), at least one client data segment, and a consumer link associated with the consumer;
   b. calculating an anonymous link for the consumer using the consumer link, wherein the step of calculating an anonymous link comprises the step of applying a hash function to the consumer link whereby the anonymous link is not derivable from the consumer link;
   c. storing the anonymous link and client data segment in a secure storage area containing no personally identifiable information (PII);
   d. using the anonymous link, looking up in a cross-reference table a marketing services provider cookie ID associated with the consumer;
   e. using the marketing services provider cookie ID associated with the consumer, looking up in the cross-reference table a distribution partner cookie ID associated with the consumer; and
   f. sending to a distribution partner the distribution partner cookie ID associated with the consumer and the client data segment for that consumer.

12. The method for supporting the placement of a targeted online advertisement for a consumer associated with a device of claim 11, further comprising the step of receiving from a client a plurality of client records in a delivered order, and randomizing the delivered order after calculating the anonymous link.

* * * * *